United States Patent Office 3,138,464
Patented June 23, 1964

3,138,464
PROCESS FOR THE PREPARATION OF A READY-FOR-USE PRESERVED FOOD MADE FROM FRESH ONIONS
Georg Kruse, 48 Lindenstrasse, Bramsche, Germany
No Drawing. Filed Mar. 30, 1962, Ser. No. 183,715
Claims priority, application Germany Apr. 29, 1961
1 Claim. (Cl. 99—154)

The invention relates to the preparation of a preserved food or partially preserved food which is made from fresh onions, is ready for use without any kind of preparation, is free from chemically-acting preserving substances and in which the appearance and flavor of the fresh product is retained. It is a further object of the invention to diminish the unpleasant aftertaste of raw onions without influencing the characteristic immediate onion taste.

The preparation of an "instant product" of this nature has the considerable advantage that it makes it unnecessary for the housewife or the kitchen to store fresh onions which tend to dry up or to perish, or to suffer from the irritation caused to the mucous membranes of the eyes and from the odor which often "clings" to the hands for days as a result of the peeling and comminution of onions. Also in relatively large commercially operated kitchens the preserved onions prepared in accordance with the process of the invention offer substantial advantages since the uneconomical loss of weight which is unavoidable when the onions are stored and the decrease in quality resulting from loss of turgescence and loss of aroma are obviated. A considerable advantage is also achieved with regard to the rational division of working time since onions cannot (as can for example potatoes) be peeled and chopped up the day before, due to the fact that they meanwhile become bitter.

Although the considerable advantages of having a ready-for-use preserved food from fresh onions are obvious, the problem of providing preserved onions of a quality comparable to that of fresh onions has hitherto remained unsolved or has been solved only in an extremely unsatisfactory manner.

It is true that it is known to put onions, by drying, into a form wherein they will not perish. These dried onions cannot, however, be considered a suitable substitute for fresh onions since the greater part of the characteristic flavor is lost in the drying process and furthermore the dried onion requires a period of several hours for the reabsorption of water which in any case is incomplete and does not yield a final product which could in any way be compared with a fresh onion.

It is furthermore known to preserve fresh onions in vinegar and to use them as pickled onions or mixed pickles or also as a component in preserved fish. It is clear that onions which have been preserved in vinegar are extremely sour and can no longer be used like fresh onions. Furthermore, the onion flavor has predominantly been "drowned" by the surrounding vinegar solution.

It is also known to prepare preserved onions in liquid or paste form, adding salt and alcohol. The addition of alcohol is, however, unpleasantly noticeable in the flavor and it is furthermore undesirable from the viewpoint of cost. Furthermore, in these known processes, the character of fresh onions is completely lost since the onions are converted to a pasty or liquid state.

A plurality of difficulties is encountered when endeavoring to solve the underlying problem of the invention, i.e. how to provide a preserved foodstuff made from fresh onions which is immediately ready for use, is free from chemically acting preserving substances and in which the appearance and flavor of the fresh product have been retained.

Whereas in most fresh foodstuffs bacterial decay due to propagation of bacteria, fungi or yeasts can be prevented relatively simply by destroying the germs and spores of the germs by means of heat, this is not possible with a preserved food made from fresh i.e. raw and uncooked onions since the heating process results in a fundamental reduction of the amount of the typical flavoring substances of the fresh onions. As is known, boiled or fried onions taste entirely differently from raw onions and are therefore not comparable with fresh, i.e. raw onions.

Furthermore, freshly-peeled and chopped onions tend to become bitter in an extremely short time. Neither the practical worker nor the scientists has hitherto been able to ascertain any very exact data about the chemical nature of these changes, so that there is no known means available for preventing this tendency of fresh onions to become bitter.

A further problem which, with the exclusion of chemical preserving agents, especially of preserving agents having a reducing effect, has hitherto not been solved by the practical worker or by the science of preserving foodstuffs resides in the yellow or yellow-brown discoloration assumed very rapidly by an onion paste, similar to the discoloration of raw, grated potatoes or apples or of the cut surfaces of such fruits or vegetables. This brown discoloration is conventionally opposed by blanching, i.e. by heating to approximately 100° during a short period of time. This process conventionally used in the preserving art can not be used for the reasons given above in preserved foodstuff consisting of raw onions. In the case of dried fruit, for example, it has hitherto been found to be practically impossible to prevent the brown discoloration in any way other than the action of a reducing preserving and blanching medium of sulphuric acid although attempts have been made for decades to replace by other processes, the use of sulphuric acid which is certainly not entirely wholesome.

Thus, considerable difficulty is encountered in the preparation of a durable onion preserve, even if chemical preserving substances are used; the preparation of a durable product of this nature without chemical preserving substances involves yet further problems of a special nature.

In this connection, it has been found that the influencing or diminishing of long-lasting and undesirable aftertaste and the unpleasant mouth odor, which results from the consumption of fresh, raw onions and discourages many people from consuming fresh onions, is a special problem. The opinion has hitherto been held that the long-lasting unpleasant aftertaste of the onions is due to allyl mustard oil, i.e., one of the volatile oils of the onions. It appeared to be an obvious step to diminish this unpleasant aftertaste which so unpleasantly accompanies the consumption of onions by diminishing the content of volatile oil.

In consequence of many years of extensive experiment, it has now been ascertained that it is possible to influence the unpleasant aftertaste without the necessity of diminishing the content of volatile oil and that, on the contrary, the highest possible content is desirable if the onion taste is to be retained completely. From the theoretical and experimental work which has been done it would appear that, in the onion, specific, characteristic bisulphides, such as allyl propyl bisulphide and thiocyanogen compounds such as allyl thiocyanate or thiocyanic acid, are responsible for the unpleasant aftertaste of the onion. It is extremely probable that a part of these substances is present in glycoside bond and—in the same way as sinigrin in mustard—requires to be released by enzymatic processes. In this connection, ferments of the type of the glycosides play the decisive part. On the basis of these presuppositions it has been found to be possible, by influencing the enzymatic reaction during and after the processing of the onions, to diminish the long-lasting, unpleasant aftertaste without thereby detrimentally influencing the immediate taste of the fresh, raw onions.

This effect is presumably due to the high salt concentration, the acid pH value and the stopping of ferment activity.

The problem of the invention has been solved by comminuting freshly-peeled onions in such manner that less than 5% of the cells in their microscopic structure is destroyed, that the comminution is carried out until a piece size of approximately 1 to 10 mm. lateral length, preferably 5 mm. lateral length, is achieved, and that considerable or complete inactivation of the enzymes in the onions is achieved, for example by adding to the onion preparation during comminution, approximately 6.0 to 12.0% of salt,
1.5 to 0.1% of pectin,
0.5 to 0.1% of ascorbic acid,
0.8 to 0.3% of citric acid.

A preferred embodiment of the additives comprises the following:

7% of sodium chloride,
1.1% of pectin,
0.17% of ascorbic acid,
0.5% of citric acid.

The values indicated hereinabove are to be understood to apply when all the components mentioned are added. If individual components are omitted, the quantities of the remaining additives are increased. The size of the pieces of onion also has an influence on the quantities of additives required. The said quantities of additives also depend on the quality for example of the pectin. Instead of pectin, it is possible to use also other thickening agents. It is also possible to add a flavonoid body, for example rutin.

I claim:

Process for the preparation of a ready-for-use durable preserved food and partially preserved food made from fresh onions, consisting of comminuting freshly peeled onions in such manner that less than 5% of the cells are destroyed in their microscopic structure; the comminution being carried out until a particle size of approximately 1–10 mm. lateral length is attained, and adding to the onion preparation during comminution approximately 6.0 to 12.0% of salt,
1.5 to 0.1% of pectin,
0.5 to 0.1% of ascorbic acid, and
0.8 to 0.3% of citric acid in order to produce a considerable to complete inactivation of the enzymes present in the onions.

References Cited in the file of this patent
UNITED STATES PATENTS

| | | |
|---|---|---|
| 1,018,909 | Jacob | Feb. 27, 1912 |
| 2,291,704 | Fisher | Aug. 4, 1942 |
| 2,536,176 | Harriss | Jan. 2, 1951 |
| 2,874,059 | Powers et al. | Feb. 17, 1959 |

OTHER REFERENCES

Kertesz: "The Pectic Substances," New York, 1951, p. 552.